United States Patent

Legault

(10) Patent No.: US 7,921,370 B1
(45) Date of Patent: Apr. 5, 2011

(54) OBJECT-LEVEL TEXT-CONDITION INDICATORS

(75) Inventor: Stephanie Lyne Legault, Nepean (CA)

(73) Assignee: Adobe Systems Incorporated, San Jose, CA (US)

(*) Notice: Subject to any disclaimer, the term of this patent is extended or adjusted under 35 U.S.C. 154(b) by 317 days.

(21) Appl. No.: 11/606,241

(22) Filed: Nov. 29, 2006

(51) Int. Cl.
G06F 3/00 (2006.01)
G06F 3/048 (2006.01)

(52) U.S. Cl. .......................... 715/762; 715/763; 715/711

(58) Field of Classification Search .................. 715/763, 715/762, 760, 705, 708, 715, 711
See application file for complete search history.

(56) References Cited

U.S. PATENT DOCUMENTS

| 6,583,798 B1* | 6/2003 | Hoek et al. ..................... 715/822 |
| 6,948,126 B2* | 9/2005 | Malamud et al. ............. 715/715 |
| 7,322,023 B2* | 1/2008 | Shulman et al. ............... 717/112 |
| 7,358,956 B2* | 4/2008 | Hinckley et al. .............. 345/156 |
| 7,373,595 B2* | 5/2008 | Jones et al. .................... 715/234 |
| 2004/0193703 A1* | 9/2004 | Loewy et al. .................. 709/220 |
| 2005/0114779 A1* | 5/2005 | Griesmer ....................... 715/711 |
| 2006/0123341 A1* | 6/2006 | Smirnov ....................... 715/708 |
| 2007/0118813 A1* | 5/2007 | Forstall et al. ................ 715/805 |

* cited by examiner

*Primary Examiner* — Dennis-Doon Chow
*Assistant Examiner* — Rashawn Tillery
(74) *Attorney, Agent, or Firm* — Kilpatrick Townsend & Stockton LLP

(57) ABSTRACT

Novel techniques and tools for indicating, to a user, that a development application has detected a condition of text that is not currently displayed. A user may use the development application to develop other applications at an object level without being distracted by text related to graphical objects in the applications being developed by the user. If the development application detects an undesirable condition in text related to a graphical object, the development application may display a graphical indicator of the detected condition. The user may then interact with the graphical indicator to obtain additional information about the detected condition and to view and modify the text in which the application detected the condition.

34 Claims, 3 Drawing Sheets

OBJECT-LEVEL TEXT-CONDITION INDICATORS

FIELD OF THE INVENTION

One embodiment of the present disclosure relates generally to development applications that include text-processing functionality. More particularly, particular embodiments disclosed herein relate to providing a visual indication on a display screen, indicating to a user that a development application has detected a text condition in text that is not displayed on the display screen.

BACKGROUND OF THE INVENTION

Conventional computerized devices, such as personal computers, laptop computers, and the like, utilize graphical user interfaces in applications, enabling users to quickly provide input to the application using "What You See Is What You Get" (WYSIWYG) technology. In general, using a graphical user interface, a user operates an input device such as a mouse or keyboard to manipulate graphical objects on a computer display. The graphical objects are often represented as icons, and the user can operate an input device such as a mouse to move a mouse pointer onto an icon (i.e., graphically overlapping the icon) on the graphical user interface. By depressing a mouse button, the application selects the icon, and if the user maintains the mouse button in a depressed state, the user can drag the icon across the graphical user interface. By releasing the mouse button, the icon is placed on the graphical user interface at the current position of the mouse pointer.

Using graphical user interface technology, users may interact with a wide variety of applications. Many of these applications include text-processing functionality that allows a user to create and modify text. These applications may also include text-processing functionality that checks for certain conditions in the text. These conditions typically include, for example, spelling errors and various grammar uses. Generally, a user requests the application to check for text conditions while the user is interacting with the application to create or edit the text. The text is displayed on a display screen and if the application detects a text condition, an indication of the text condition is displayed on the display screen together with the portion of text containing the condition. For example, if the text-processing functionality of the application detects a misspelled word, the application may display a wavy line directly underneath the misspelled word to indicate to the user which word is misspelled. Similarly, if the text-processing functionality of the application detects a generally undesirable grammar usage, such as passive voice, the application may highlight the text and display a window region, such as a popup window, containing text such as "passive voice" to indicate the detected condition to the user.

SUMMARY OF THE INVENTION

During operation of many applications, a graphical user interface may display graphical objects that have text related to them. Frequently, the graphical user interface does not display the text related to the graphical objects unless a user specifically provides input requesting the text to be displayed. For example, many graphical objects have tooltips associated with them. A tooltip is a common graphical user interface element. A graphical user interface uses tooltips in conjunction with a cursor, usually a mouse pointer. In operation, a user hovers the cursor over a graphical object, without clicking it, and the graphical user interface displays a small box containing supplementary information regarding the graphical object being hovered over. The supplementary information frequently includes text related to the graphical object hovered over and the graphical user interface does not display this text until a user hovers the cursor over the graphical object. Another term for tooltip, sometimes used in end-user documentation, is "ScreenTip." In a common variant, especially in older software, a graphical user interface may display a textual description of the graphical object in a status bar.

Developers including help text in a tooltip typically will not only name the graphical object being looked at, but will also include text explaining to the user any state the graphical object might have. For instance, tooltips might say something like "copy" to explain a button, but frequently the tooltip may include, for example, the more detailed "Copies the selected text onto the clipboard", or "Not available now because there is no selection." The later feature can be invaluable, for example, to a user trying to understand why a particular menu item was greyed out. Web Page designers and Form designers frequently build tooltips for use with graphical objects to be displayed on Web pages and Forms. For example, many graphical Web browsers display the title attribute of an HTML element as a tooltip when a user hovers the cursor over that element. In such a browser, a user is able to hover over hyperlinks and other images, causing the graphical user interface to display a tooltip.

In another approach that aims to provide help text in a slightly different way, a graphical user interface may display balloon help. Developers of applications having a graphical user interface have used the phrase "balloon help" to refer to the way help text is displayed. The graphical user interface may display the text in "balloons" like those containing the words in a comic strip. Application developers started using balloon help to improve on deficiencies in early help systems, which were often nothing more than a paper manual copied into an electronic form. In a graphical user interface that often included non-standard buttons and other widgets labeled with an indecipherable icon, many functions required a user to read the paper manual to decipher how to invoke and use the functions. Users generally refused to read the manual, and instead ended up not using the full power of the applications since much of the functionality was obscure or "hidden." Balloon help was implemented as an attempt to overcome these problems. Many application developers now use the phrase "balloon help" to refer to any sort of pop-up help text.

Displaying graphical objects without displaying related text allows a developer of an application to develop the application at an object level. That is, a developer may interact with or manipulate a potentially large number of graphical objects, for example, by adding, moving, and deleting graphical objects in an effort to create or modify an application (e.g., web page, form, etc.) without being distracted by a display of the text related to each graphical object being displayed.

However, because text related to graphical objects may not be displayed, an application developer may be unaware of undesirable conditions in the related text. For example, a developer may be adding buttons or other graphical objects that have an undesirable text condition, such as a spelling error or undesirable grammar usage, in the related text. Even if the developer executes an application such as a spell-checker, for example, the developer would still be unaware of the undesirable condition since the text containing the undesirable text condition is not displayed.

Techniques and tools discussed herein deviate with respect to and improve upon conventional technology such as discussed above and other techniques and tools also known in the prior art. In a first embodiment, methods are disclosed that are useful in creating applications having a graphical user interface including graphical objects that have text related to the graphical object. Such methods involve detecting, in an application having a graphical user interface, a text condition in text related to a graphical object displayed by the graphical user interface. At the time the text condition is detected, the graphical user interface is not displaying the text. In response to detecting the text condition in the text related to the graphical object, the graphical user interface displays a graphical indicator of the detected condition. The graphical user interface displays the graphical indicator in a manner that makes the graphical indicator substantially likely to indicate to a developer (or other user) of the application that the graphical indicator is associated with the graphical object. The developer may interact with the graphical indicator to display the related text and to ascertain additional information about the nature of the detected condition. Thus, the graphical indicator may be a second graphical object that a user can interact with to learn more about the detected condition. By interacting with the graphical indicator, a user may also invoke a word-processing function that enables the user to correct the detected condition.

In a second embodiment, logic is disclosed that is operable to perform methods and process disclosed herein. The logic can be incorporated into a development application that allows a developer to develop applications at an object level without being distracted by a display of the text related to each graphical object in the application being developed. The development application can display a graphical indicator if the development application detects a text condition in the related text. In a third embodiment, computer systems are disclosed that are enabled to run development applications that can perform methods and processes disclosed herein.

Methods, logic, and computer systems disclosed herein can be advantageously utilized to provide development applications that allow a developer to develop applications at an object level without being distracted by text related to graphical objects in the developed applications. If a development application detects a text condition in text related to a graphical object, the development application may display a graphical indicator of the detected condition. It is to be understood that the inventive matter disclosed herein may be embodied strictly as a software program, as software and hardware, or as hardware alone. The features disclosed herein may be employed in data communications devices and other computerized devices and software systems for such devices such as those manufactured by Adobe Systems, Inc., of San Jose, Calif.

BRIEF DESCRIPTION OF THE DRAWINGS

The above and further objects, features, and advantages of disclosed embodiments may be better understood by referring to the following description in conjunction with the accompanying drawings, in which like reference characters indicate like structural elements and features in the various figures. The drawings are not meant to limit the scope of the invention. For clarity, not every element may be labeled in every figure. The drawings are not necessarily to scale, emphasis instead being placed upon illustrating embodiments, principles, and concepts.

DESCRIPTION OF EXAMPLE EMBODIMENTS

Figure 1:
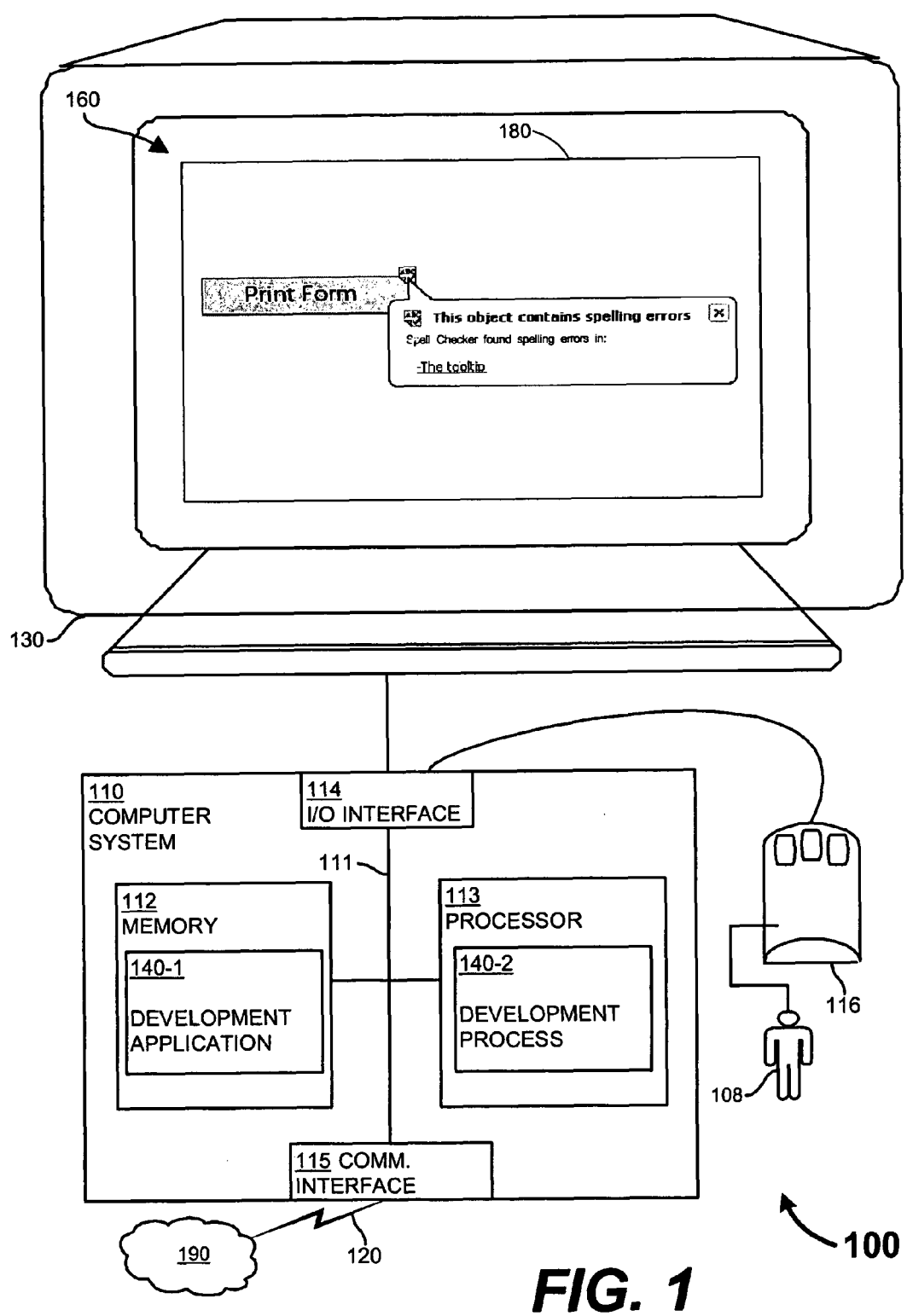
FIG. 1 is a block diagram of a computer environment illustrating an example architecture of a respective computer system useful for implementing a development application according to embodiments disclosed herein.

FIG. 1 is a block diagram of a computer environment 100 illustrating an example architecture of a respective computer system 110 useful for implementing a development application 140-1 according to embodiments disclosed herein. Computer system 110 can be a computerized device such as a personal computer, workstation, portable computing device, console, network terminal, processing device, etc. As shown, computer system 110 of the present example includes an interconnect 111, such as a data bus or other circuitry, that couples a memory system 112, a processor 113, I/O interface 114, and a communications interface 115. An input device 116 (e.g., one or more user/developer-controlled devices such as a keyboard, mouse, touchpad, trackball, etc.) couples to the processor 113 through the I/O interface 114 and enables a user 108, such as a web page or form developer, to provide input commands and generally interact with the graphical user interface 160 that the development application 140-1 and the development process 140-2 provide on a display 130. I/O interface 114 potentially provides connectivity to peripheral devices such as the input device 116, display screen 130, etc. Communications interface 115 enables computer system 110 to communicate with network 190 over the communication link 120 to retrieve and transmit information from remotely located sources if necessary.

As shown, memory system 112 can be any type of computer-readable medium and in this example is encoded with development application 140-1 that supports functionality as herein described. Development application 140-1 can be embodied as computer software code such as data and/or logic instructions (e.g., code stored in the memory or on another computer-readable medium such as a disk) that supports processing functionality according to different embodiments described herein. During operation of the computer system 110, processor 113 accesses the memory system 112 via the interconnect 111 in order to launch, run, execute, interpret, or otherwise perform the logic instructions of the development application 140-1. Execution of the development application 140-1 produces processing functionality in a development process 140-2. In other words, the development process 140-2 represents one or more portions of the development application 140-1 performing within or upon the processor 113 in the computer system 110. Those skilled in the art will understand that the computer system 110 can include other processes and/or software and hardware components, such as an operating system that controls allocation and use of hardware resources.

It should be noted that, in addition to the development process 140-2 that carries out method operations as discussed herein, other embodiments herein include the development application 140-1 itself (i.e., the un-executed or non-performing logic instructions and/or data). The development application 140-1 may be stored on a computer-readable medium such as a floppy disk, hard disk, or in an optical medium. According to other embodiments, the development application 140-1 can also be stored in a memory type system such as in firmware, read only memory (ROM), or, as in this example, as executable code within the memory system 112 (e.g., within Random Access Memory or RAM). Thus, it should be understood that embodiments disclosed herein include logic encoded in one or more tangible media for execution and, when executed, operable to perform methods and processes disclosed herein.

Figure 2:
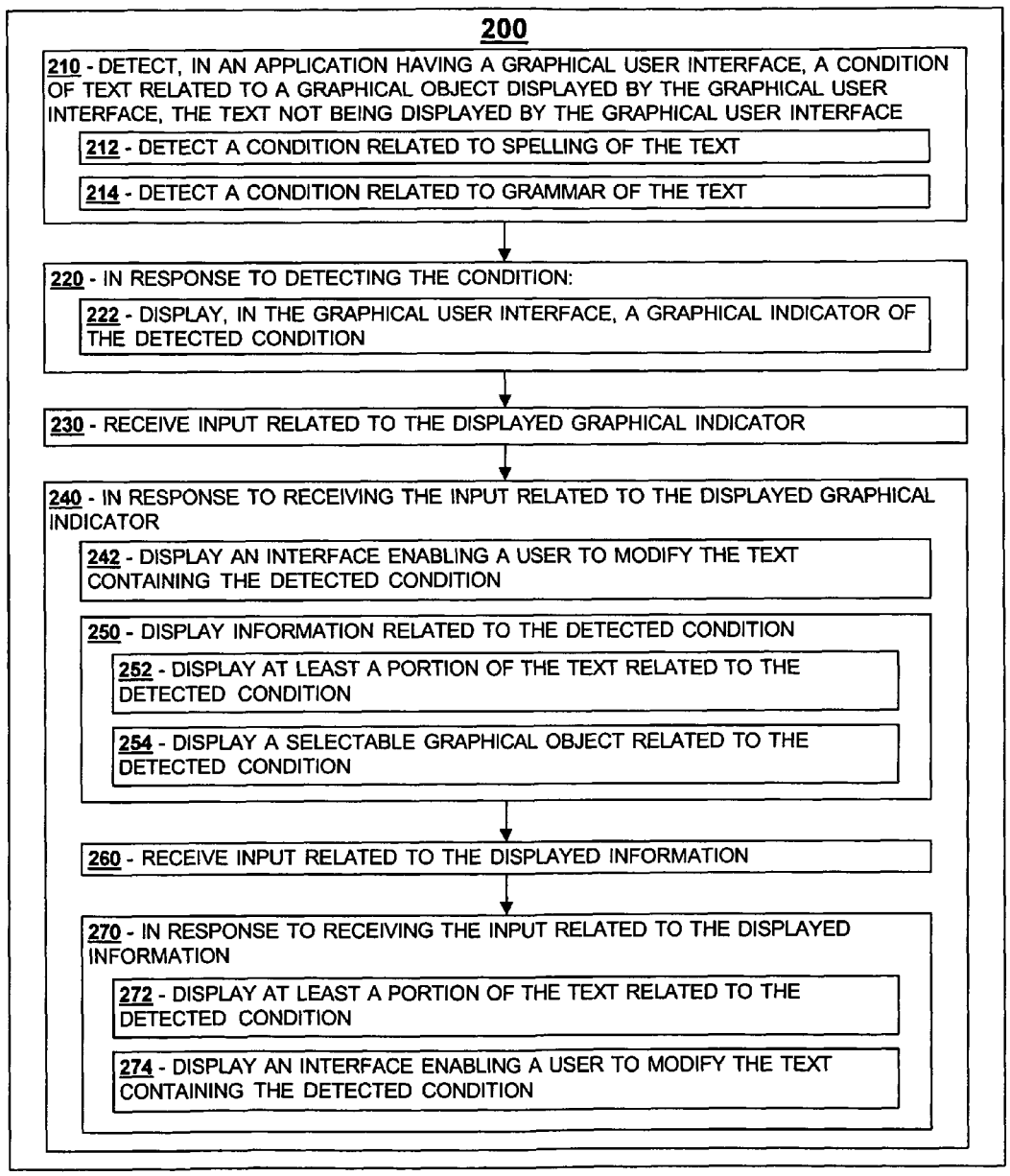
FIG. 2 illustrates procedures performable by a development process in accordance with embodiments disclosed herein.
Figure 3:
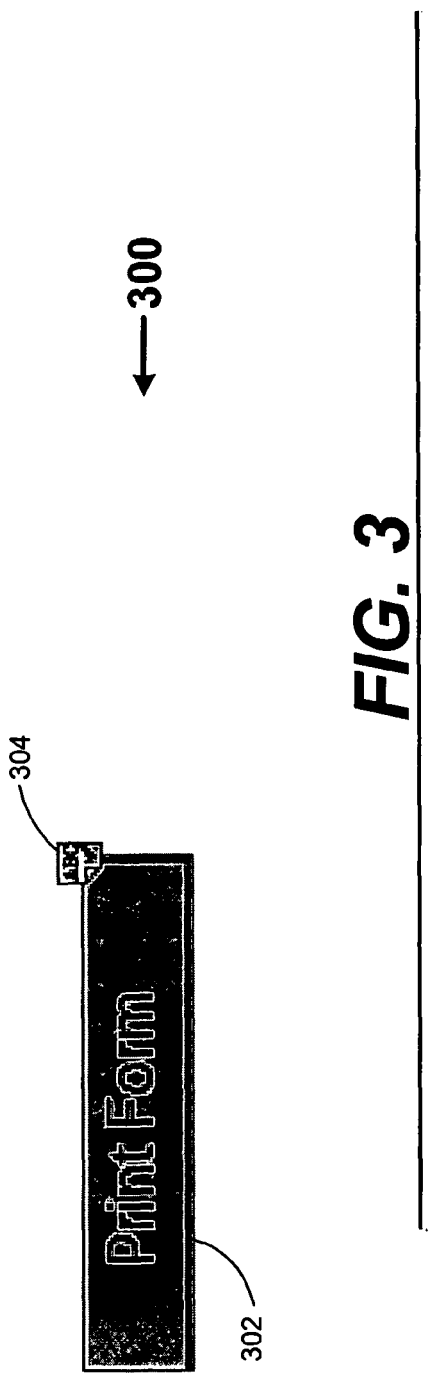
FIG. 3 illustrates a graphical indicator in accordance with embodiments disclosed herein.

Functionality supported by computer system 110 and, more particularly, functionality associated with development application 140-1 and development process 140-2 is herein discussed in relation to FIGS. 1-3. For purposes of the following discussion, computer system 110 (e.g., development application 140-1 and/or development process 140-2) generally performs procedures in FIG. 2. However, other systems can be configured to provide similar functionality.

The graphical user interface 160 displays a project 180. During the operation of the development application 140-1, a user may interact with the graphical user interface 160 to create an application, such as a web page or a form. During the creation of the application a user 108 may manipulate (e.g., add, remove, or modify) numerous graphical objects, such as virtual buttons for example. These graphical objects may have related text, such as text in a tooltip, which the graphical user interface 160 generally does not display during the creation of the application unless the user 108 requests the text to be displayed.

FIG. 2 illustrates procedures performable by a development process 140-2 in accordance with embodiments disclosed herein. In step 210, the development application 140-1 detects a condition of text related to a graphical object displayed by the graphical user interface 160. The text condition may be detected, for example, by a text-processing function of the development application 140-1. Text-processing functions, such as spell checkers and grammar checkers, are known in the art. At the time the development application 140-1 detects the text condition, the graphical user interface 160 has not displayed the text and, therefore, the user 108 should be unaware that the development application 140-1 has detected the condition. In step 212, the development application 140-1 detects a condition related to spelling of the text. Thus, the text-processing function may detect a spelling error in at least one word of the text related to the graphical object displayed by the graphical user interface 160. In step 214, the development application 140-1 detects a condition related to grammar of the text. That is, the text-processing function may detect a grammar error in the text related to the graphical object displayed by the graphical user interface 160.

In step 220, the development application 140-1 responds to the detection of the text condition. In step 222, the development application 140-1 displays a graphical indicator of the detected text condition. The graphical indicator should be displayed in a manner that makes the graphical indicator substantially likely to indicate to the user 108 of the development application 140-1 that the graphical indicator is associated with the graphical object. The purpose of displaying the graphical indicator is to make the user 108 aware that the development application 140-1 has detected a text condition in the text related to the graphical object with which the graphical indicator is associated. In FIG. 3 for example, the development application 140-1 has displayed a graphical indicator 304 in a manner such that it partially overlays the "Print Form" button 302 (i.e., a graphical object), indicating to the user 108 that the development application 140-1 has detected a text condition in the text related to the "Print Form" button 302.

The development application 140-1 may display a graphical indicator having a design indicative of the type of text condition detected. That is, the development application 140-1 may display a graphical indicator having a particular design whenever a spelling error is detected and may display a graphical indicator having a different particular design whenever a grammar error is detected. In this manner, the user can ascertain the type of text condition (e.g., spelling error, grammar error, etc.) detected immediately upon viewing the displayed graphical indicator without first having to view the text containing the detected condition. In particular embodiments, the development application 140-1 may display multiple graphical indicators associated with the same graphical object. For example, the development application 140-1 might display a first graphical indicator to indicate at least one detected condition of a particular type (e.g., spelling error) and might display a second graphical indicator to indicate at least one detected condition of a different particular type (e.g., grammar error).

Figure 4:
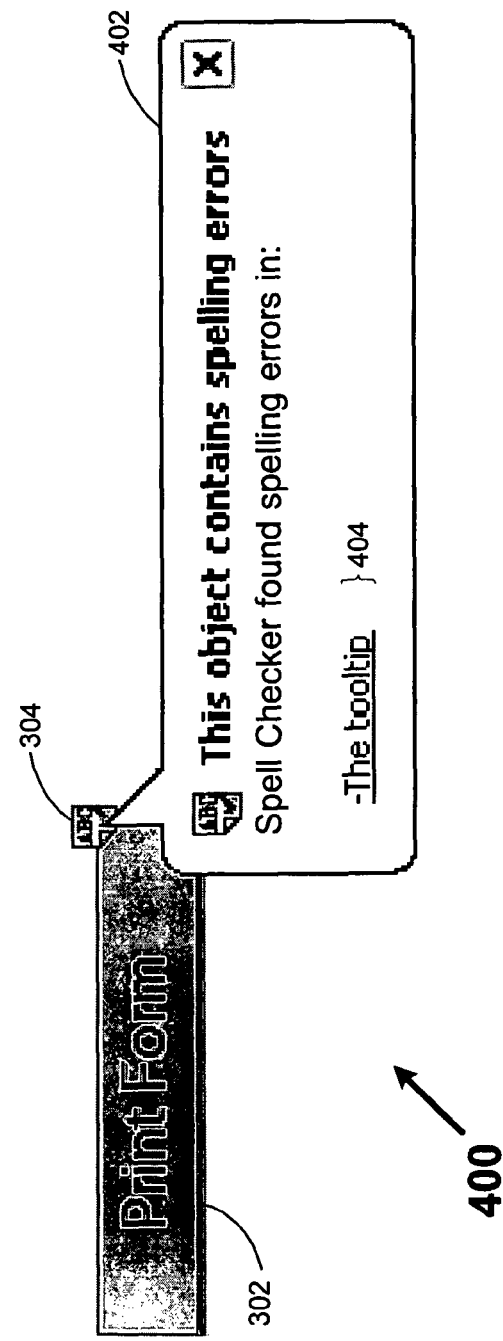
FIG. 4 illustrates a display of information related to a graphical indicator in accordance with embodiments disclosed herein.

The graphical indicator may be a graphical object to which the user 108 can provide input. For example, the graphical indicator may have a tooltip associated with it that the user 108 can view by hovering the cursor over the graphical indicator. Additionally, the graphical indicator may be selectable, allowing the user 108 to select the graphical indicator, for example, by either left-clicking on the graphical indicator or right-clicking on the graphical indicator. FIG. 4 illustrates a display of information (i.e., balloon help) related to the graphical indicator 304 associated with the "Print Form" button 302 in accordance with embodiments disclosed herein. In step 230, the development application 140-1 receives input related to a displayed graphical indicator.

In step 240, the development application 140-1 responds to receiving input related to a displayed graphical indicator. In step 242, the development application 140-1 displays an interface that enables the user 108 to modify the text containing the detected condition. For example, the graphical object might be an icon representing a document containing text. If the development application 140-1 detects a text condition in the document, the development application 140-1 may display a graphical indicator of the detected condition. In particular embodiments, the user 108 may double-click on the graphical indicator. The development application 140-1 may respond to the double-click input, for example, by invoking the word processor that was used to create the document. The user 108 may then interact with the word processor to view the text and modify the text if the user 108 so desires. Alternately, the graphical object may represent some other construct containing text and, upon receiving the double-click input, the development application 140-1 may invoke some other word-processing application, allowing the user to view and modify the text containing the detected condition.

In step 250, the development application 140-1 may respond to receiving input related to a displayed graphical indicator, by displaying information related to a detected text condition. The displayed information may include, for example, text describing the type of text condition detected. In step 252, for example, the development application 140-1 displays at least a portion of the text related to the text condition that was detected. Additionally, the displayed information may include at least one menu item or list item, each menu item or list item representing a separate detected condition. In step 254, the development application 140-1 displays a selectable graphical object related to the detected condition. For example, the balloon help 402 in FIG. 4 comprises displayed information including information describing the type of text condition detected. That is, the balloon help 402 displays information indicating that the graphical object 302 contains spelling errors. Additionally, the balloon help 402 includes an item 404 that indicates at least one spelling error was detected in the graphical object's tooltip. The graphical object 404 may be a selectable graphical object that when selected by the user 108 causes the development application 140-1 to display additional information, the additional information being related to the text condition detected in the tooltip of the "Print Form" button 302.

The user 108 may provide input related to the displayed information, which is in turn related to the detected text condition. For example, the user may select the graphical object 404 as described above. For example, the user may single left-click graphical object 404, single right-click graphical object 404, or double-click graphical object 404. Alternately, the user 108 might hover the cursor over the graphical object 404. In step 260, the development application 140-1 receives input related to the displayed information.

In step 270, the development application 140-1 responds to receiving the input related to the displayed information. In step 272, the development application 140-1 responds to the received input by displaying at least a portion of the text in which the condition was detected. Which type of input causes the development application 140-1 to respond by displaying at least a portion of the text in which the condition was detected may vary among different embodiments. For example, in some embodiments, the development application 140-1 may display at least a portion of the tooltip text containing a spelling error in response to the user 108 hovering the cursor over the graphical object 404. In other embodiments, the development application 140-1 may display at least a portion of the tooltip text containing a spelling error in response to the user 108 right clicking on the graphical object 404.

In step 274, the development application 140-1 responds to the received input by displaying an interface that enables the user 108 to modify the text containing the detected condition. Analogous to step 242, the development application 140-1 may respond to the input, for example, by invoking the word processor that was used to create the document. The user 108 may then interact with the word processor to view the text and modify the text if the user 108 so desires. Which type of input causes the development application 140-1 to respond by displaying an interface that enables the user 108 to modify the text containing the detected condition may vary among different embodiments. For example, in some embodiments, the development application 140-1 may display such an interface in response to the user 108 inputting a single left-click on the graphical object 404. In other embodiments, the development application 140-1 may display such an interface in response to the user 108 inputting a double-click on the graphical object 404.

In accordance with embodiments described herein, novel methods and related tools for indicating to a user that a text condition has been detected have been provided. While inventive matter has been shown and described herein with reference to specific embodiments thereof, it should be understood by those skilled in the art that variations, alterations, changes in form and detail, and equivalents may be made or conceived of without departing from the spirit and scope of the inventive matter. The foregoing description of the inventive matter is not intended to be limiting. Rather, the scope of the inventive matter should be assessed as that of the appended claims and by equivalents thereof.

What is claimed is:

1. A computer-implemented method comprising:
    detecting, in a graphical user interface development application having a graphical user interface, an error condition associated with text related to a graphical user interface element in an application being developed, wherein the detecting occurs while the graphical user interface element is unopened in the development application;
    displaying a graphical object representing an unopened version of the graphical user interface element, the graphical user interface element, storing the text that has the error condition; and
    in response to detecting the error condition:
    displaying, in the graphical user interface, a graphical indicator with the displayed graphical object, the graphical indicator indicating the error condition associated with the text related to the graphical user interface element.

2. The method of claim 1 wherein detecting the error condition comprises:
    detecting an error associated with a spelling of the text in the graphical user interface element.

3. The method of claim 1 wherein the detected error condition comprises one of a plurality of types of conditions and displaying the graphical indicator further comprises:
    displaying the type of the detected error condition.

4. The method of claim 1, comprising:
    receiving input applied to the displayed graphical indicator; and
    in response to receiving the input, invoking a word processor that was used to create the text in the graphical user interface element; and
    displaying the text in the word processor; and
    via the word processor, enabling modification of the text in the graphical user interface element.

5. The method of claim 1, comprising:
    receiving input related to the displayed graphical indicator; and
    in response to receiving the input related to the displayed graphical indicator:
        displaying information related to the detected error condition.

6. The method of claim 5, wherein displaying information related to the detected error condition comprises:
    displaying at least a portion of the text in which the error condition was detected.

7. The method of claim 5, wherein displaying information related to the detected error condition comprises:
    displaying a selectable graphical object related to the detected error condition.

8. The method of claim 5, comprising:
    receiving input related to the displayed information; and
    in response to receiving input related to the displayed information:
        displaying at least a portion of the text in which the error condition was detected.

9. The method of claim 5, comprising:
    receiving input related to the displayed information; and
    in response to receiving the input related to the displayed information:
        displaying an interface enabling a user to modify the text in which the error condition was detected.

10. The method of claim 7, comprising:
    receiving input related to the selectable graphical object; and
    in response to receiving input related to the selectable graphical object,
        displaying at least a portion of the text in which the error condition was detected.

11. Logic encoded in one or more non-transitory computer-readable media for execution and when executed operable to:
    detect, in an application development environment, in an application having a graphical user interface, an error condition associated with text related to a graphical user interface element, wherein the error is detected while the graphical user interface element is unopened in the development environment;

display a graphical object representing an unopened version of the graphical user interface element, the graphical user interface element storing the text that has the error condition; and in response to detecting the error condition:

display, during application development, in the graphical user interface, a graphical indicator with the displayed graphical object, the graphical indicator indicating the error condition associated with the text related to the graphical user interface element.

12. The logic of claim 11, wherein the error condition is related to the spelling of the text.

13. The logic of claim 11, wherein the logic is operable to:
detect, in an application having a graphical user interface, a condition of text related to a graphical object displayed by the graphical user interface, the text not being displayed by the graphical user interface, the detected condition comprising one of a plurality of types of conditions; and
in response to detecting the condition:
display, in the graphical user interface, a graphical indicator indicative of a type of the detected error condition.

14. The logic of claim 11, wherein the logic is operable to:
receive input applied to the displayed graphical indicator; and
in response to receiving the input related to the displayed graphical indicator:
display an interface enabling a user to modify the text in which the error condition was detected.

15. The logic of claim 11, wherein the logic is operable to:
receive input related to the displayed graphical indicator; and
in response to receiving the input related to the displayed graphical indicator:
display information related to the detected error condition.

16. The logic of claim 15, wherein the logic is operable to:
in response to receiving the input related to the displayed graphical indicator:
display information related to the detected error condition, the displayed information comprising at least a portion of the text in which the error condition was detected.

17. The logic of claim 15, wherein the logic is operable to:
in response to receiving the input related to the displayed graphical indicator:
display information related to the detected error condition, the displayed information comprising a selectable graphical object related to the detected error condition.

18. The logic of claim 15, wherein the logic is operable to:
receive input related to the displayed information; and
in response to receiving input related to the displayed information:
display at least a portion of the text in which the error condition was detected.

19. The logic of claim 15, wherein the logic is operable to:
receive input related to the displayed information; and
in response to receiving the input related to the displayed information:
display an interface enabling a user to modify the text in which the error condition was detected.

20. The logic of claim 17, wherein the logic is operable to:
receive input related to the selectable graphical object; and
in response to receiving input related to the selectable graphical object, perform at least one of the group of:
display at least a portion of the text in which the error condition was detected; and
display an interface enabling a user to modify the text in which the error condition was detected.

21. A computer system comprising:
a processor;
a memory unit that stores instructions associated with an application executed by the processor; and
an interconnect coupling the processor and the memory unit, enabling the computer system to execute the application and perform operations comprising:
detecting, in an application development environment, in an application under development having a graphical user interface, a error condition associated with text in a popup control to be activated at application runtime, wherein the detecting occurs while the text in the popup control is not displayed in the development environment;
displaying, in the application development environment, a graphical object incorporating the popup control in response to detecting the condition and
displaying, during application development, in the development environment, a graphical indicator of the detected error condition adjacent the graphical object, wherein the graphical indicator is not displayed at application runtime.

22. The method of claim 1 wherein detecting the error condition comprises detecting the error condition in user editable text.

23. The method of claim 1 wherein detecting the error condition comprises detecting the error condition in user entered text.

24. The method of claim 1 wherein detecting the error condition comprises detecting the error condition in the absence of user interaction with the application.

25. The method as in claim 1 further comprising:
displaying the graphical indicator as a selectable icon for receiving input.

26. The method as in claim 25 further comprising:
in response to receiving input applied to the displayed graphical indicator, initiating display of a notification window;
populating the notification window with descriptive information, the descriptive information indicating the error condition associated with the text.

27. The method of claim 26 further comprising:
populating the notification window to include a selectable icon.

28. The method as in claim 27 further comprising:
in response to detecting a cursor providing input to the selectable icon in the notification window, initiating display of additional descriptive information to view the error condition associated with the text.

29. The method as in claim 1 further comprising:
initiating display of multiple graphical indicators with the graphical object, each of the multiple graphical indicators indicating a different error condition associated with the text in the graphical user interface element.

30. The method as in claim 29, wherein initiating display of the multiple graphical indicators comprises:
initiating display of a first graphical indicator, the first graphical indicator indicating a spelling error associated with the text in the graphical user interface element; and initiating display of a second graphical indicator, the second graphical indicator indicating a grammar error associated with the text in the graphical user interface element.

31. The method of claim 1 displaying a graphical object representing an unopened version of a graphical user interface element comprises displaying a graphical object representing an unopened version of a popup control.

32. The method of claim 21 wherein the popup control comprises a tooltip.

33. The method of claim 21 further comprising perform operations of:
    receiving input related to the displayed graphical indicator; and
    in response to receiving the input related to the displayed graphical indicator:
        displaying information related to the detected error condition comprising:
        receiving input related to the displayed information;
        in response to receiving the input related to the displayed information:
            displaying an interface enabling a user to modify the text in which the error condition was detected; and
            invoking a word processing application for correcting the detected condition.

34. The method of claim 33, wherein displaying information related to the detected condition comprises:
    displaying a selectable graphical object indicating the popup control including the associated text.

* * * * *